(12) United States Patent
Almasi et al.

(10) Patent No.: US 7,984,450 B2
(45) Date of Patent: Jul. 19, 2011

(54) DISPATCHING PACKETS ON A GLOBAL COMBINING NETWORK OF A PARALLEL COMPUTER

(75) Inventors: Gheorghe Almasi, Ardsley, NY (US); Charles J. Archer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/946,136

(22) Filed: Nov. 28, 2007

(65) Prior Publication Data

US 2009/0138892 A1    May 28, 2009

(51) Int. Cl.
*G06F 13/00* (2006.01)
(52) U.S. Cl. .................................. 719/313; 718/106
(58) Field of Classification Search .................. 719/313; 718/106
See application file for complete search history.

(56) References Cited

U.S. PATENT DOCUMENTS

| | | |
|---|---|---|
| 4,860,201 A | 8/1989 | Stolfo et al. |
| 4,910,669 A | 3/1990 | Gorin et al. |
| 5,063,562 A | 11/1991 | Barzilai et al. |
| 5,095,444 A | 3/1992 | Motles |
| 5,491,691 A | 2/1996 | Shtayer et al. |
| 5,651,099 A | 7/1997 | Konsella |
| 5,815,793 A | 9/1998 | Ferguson |
| 5,826,262 A | 10/1998 | Bui et al. |
| 5,826,265 A | 10/1998 | Van Huben et al. |
| 5,859,981 A | 1/1999 | Levin et al. |
| 5,862,381 A | 1/1999 | Advani et al. |
| 5,875,190 A | 2/1999 | Law |
| 5,912,893 A | 6/1999 | Rolfe et al. |
| 5,918,020 A | 6/1999 | Blackard et al. |
| 5,937,201 A * | 8/1999 | Matsushita et al. ........... 713/310 |
| 5,953,336 A | 9/1999 | Moore et al. |
| 5,982,771 A | 11/1999 | Caldara et al. |
| 6,006,032 A | 12/1999 | Blandy et al. |
| 6,047,122 A | 4/2000 | Spiller |
| 6,057,839 A | 5/2000 | Advani et al. |
| 6,101,495 A | 8/2000 | Tsuchida et al. |
| 6,115,357 A | 9/2000 | Packer et al. |
| 6,118,777 A | 9/2000 | Sylvain |
| 6,126,331 A | 10/2000 | Komatsu et al. |
| 6,253,372 B1 | 6/2001 | Komatsu et al. |
| 6,336,143 B1 | 1/2002 | Diedrich et al. |

(Continued)

OTHER PUBLICATIONS

Bershad et al. SPIN—An Extensible Microkernel for Application-Specific Operating System Services. ACM SIGOPS Operating System Review. vol. 29, Issue 1 (Jan. 1995). pp. 74-77.

(Continued)

*Primary Examiner* — Andy Ho
(74) *Attorney, Agent, or Firm* — Biggers & Ohanian, LLP

(57) ABSTRACT

Methods, apparatus, and products are disclosed for dispatching packets on a global combining network of a parallel computer comprising a plurality of nodes connected for data communications using the network capable of performing collective operations and point to point operations that include: receiving, by an origin system messaging module on an origin node from an origin application messaging module on the origin node, a storage identifier and an operation identifier, the storage identifier specifying storage containing an application message for transmission to a target node, and the operation identifier specifying a message passing operation; packetizing, by the origin system messaging module, the application message into network packets for transmission to the target node, each network packet specifying the operation identifier and an operation type for the message passing operation specified by the operation identifier; and transmitting, by the origin system messaging module, the network packets to the target node.

18 Claims, 8 Drawing Sheets

U.S. PATENT DOCUMENTS

| | | | |
|---|---|---|---|
| 6,438,702 | B1 | 8/2002 | Hodge |
| 6,490,566 | B1 | 12/2002 | Schmidt |
| 6,493,637 | B1 | 12/2002 | Steeg |
| 6,563,823 | B1 | 5/2003 | Przygienda et al. |
| 6,600,721 | B2 | 7/2003 | Edholm |
| 6,633,937 | B2 | 10/2003 | Thomson |
| 6,836,480 | B2 | 12/2004 | Basso et al. |
| 6,839,829 | B1 | 1/2005 | Daruwalla et al. |
| 6,952,692 | B1 | 10/2005 | Bhattiprolu et al. |
| 7,197,577 | B2 | 3/2007 | Nellitheertha |
| 7,216,217 | B2 | 5/2007 | Hansen et al. |
| 7,301,541 | B2 | 11/2007 | Hansen et al. |
| 7,509,244 | B1 | 3/2009 | Shakeri et al. |
| 7,527,558 | B2 | 5/2009 | Lavoie et al. |
| 7,673,011 | B2 | 3/2010 | Archer et al. |
| 2002/0065930 | A1 | 5/2002 | Rhodes |
| 2003/0021287 | A1 | 1/2003 | Lee et al. |
| 2003/0074142 | A1 | 4/2003 | Steeg |
| 2004/0015494 | A1 | 1/2004 | Basso et al. |
| 2004/0098373 | A1 | 5/2004 | Bayliss et al. |
| 2004/0111398 | A1 | 6/2004 | England et al. |
| 2005/0060462 | A1 | 3/2005 | Ota |
| 2005/0182834 | A1 | 8/2005 | Black |
| 2006/0059196 | A1 | 3/2006 | Sato et al. |
| 2006/0203739 | A1 | 9/2006 | Padmanabhan et al. |
| 2006/0292292 | A1 | 12/2006 | Brightman et al. |
| 2007/0016589 | A1 | 1/2007 | Hara et al. |
| 2007/0179760 | A1 | 8/2007 | Smith |
| 2008/0109569 | A1 | 5/2008 | Leonard et al. |
| 2008/0126739 | A1 | 5/2008 | Archer et al. |
| 2008/0148355 | A1 | 6/2008 | Archer et al. |
| 2008/0240115 | A1 | 10/2008 | Briscoe et al. |
| 2008/0313376 | A1 | 12/2008 | Archer et al. |
| 2008/0313661 | A1 | 12/2008 | Blocksome et al. |
| 2009/0003344 | A1* | 1/2009 | Kumar .......................... 370/392 |
| 2009/0089328 | A1 | 4/2009 | Miller |
| 2009/0113308 | A1 | 4/2009 | Almasi et al. |
| 2009/0138892 | A1 | 5/2009 | Almasi et al. |

OTHER PUBLICATIONS

Bershad et al. SPIN—An Extensible Microkernel for Application-Specific Operating System Services. Technical Report Mar. 3, 1994 (Feb. 28, 1994). pp. 1-16. [Retrieved on Nov. 23, 2009].

Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.

"Windows Native Processor Performance Control", Windows Platform Design Notes—Designing Hardware for the Microsoft Windows Family of Operating Systems, Nov. 12, 2002.

Office Action Dated Dec. 10, 2009 in U.S. Appl. No. 11/553,040.

Office Action Dated Oct. 3, 2008 in U.S. Appl. No. 11/531,846.

Final Office Action Dated Mar. 2, 2009 in U.S. Appl. No. 11/531,846.

Office Action Dated Jul. 31, 2009 in U.S. Appl. No. 11/531,846.

Office Action Dated Apr. 29, 2009 in U.S. Appl. No. 11/764,282.

Final Office Action Dated Dec. 8, 2009 in U.S. Appl. No. 11/764,282.

Notice of Allowance Dated Oct. 13, 2009 in U.S. Appl. No. 11/837,015.

Chan, Ernie et al. "Collective Communication on Architectures that Support Simultaneous Communication over Multiple Links", PPoPP'06, Mar. 29-31, 2006, New York, New York, USA, pp. 2-11.

Mao, Weizhen et al. "One-To-All Personalized Communication in Torus Networks", Proceedings of the 25$^{th}$ IASTED International Multi-Conference: parallel and distributed computing networks, Innsbruck, Austria, 2007, pp. 291-296.

Almasi, George et al. "Optimization of MPI Collective Communication on BlueGene/L Systems", ICS'05, Jun. 20-22, 2005, Boston, MA, USA, 2005, pp. 253-262.

Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.

Notice of Allowance Dated Apr. 6, 2010 In U.S. Appl. No. 11/531,846.

Final Office Action Dated Apr. 29, 2010 In U.S. Appl. No. 11/553,040.

Office Action Dated Jul. 12, 2010 In U.S. Appl. No. 11/764,282.

Office Action Dated May 3, 2010 In U.S. Appl. No. 12/180,963.

Nenad Stankovic Kang Zhang, Visual Programming for Message-Passing Systems (1999), International Journal of Software Engineering and Knowledge Engineering.

Matthew J. Sottile, Vaddadi P. Chandu, David A. Bader, Performance analysis of parallel programs via message-passing graph traversal, College of Computing, Georgia Institute of Technology, Feb. 25, 2006.

Office Action, U.S. Appl. No. 11/946,934, Nov. 24, 2010.

Office Action, U.S. Appl. No. 11/924,934, Aug. 19, 2010.

Notice of Allowance, U.S. Appl. No. 11/764,282, Dec. 10, 2010.

Office Action, U.S. Appl. No. 11/832,192, Oct. 29, 2010.

Office Action, U.S. Appl. No. 12/166,748, May 27, 2010.

Office Action, U.S. Appl. No. 12/166,748, Aug. 25, 2010.

Notice of Allowance, U.S. Appl. 12/180,963, Oct. 20, 2010.

* cited by examiner

DISPATCHING PACKETS ON A GLOBAL COMBINING NETWORK OF A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for dispatching packets on a global combining network of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost. Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

The software used to implement message passing among compute nodes typically is divided into two messaging layers—an application messaging layer and a system messaging layer. The application messaging layer exposes system-independent software functionality to a parallel algorithm through an application programming interface ('API'). The application messaging layer may be implemented according to, for example, the Message Passing Interface ('MPI') family of specifications promulgated by the MPI Forum, the Parallel Virtual Machine ('PVM') specifications developed by the University of Tennessee, Oak Ridge National Laboratory and Emory University, or the Aggregate Remote Memory Copy Interface ('ARMCI') platform. The system messaging layer provides system-specific software and hardware functionality to implement messaging passing between compute nodes by exposing a system-specific API to the application messaging layer. In such a manner, parallel applications may be written independently of the system on which the application are executed because the parallel applications make system-independent function calls to the application messaging layer, which in turn, makes system-specific function calls into the system messaging layer. In the current art, the application messaging layer typically supports only a single messaging passing implementation at any given time. For example, the application messaging layer may support messaging passing implemented according to the MPI or PVM during any given time period, but not both MPI and PVM concurrently.

SUMMARY OF THE INVENTION

Methods, apparatus, and products are disclosed for dispatching packets on a global combining network of a parallel computer, the parallel computer comprising a plurality of compute nodes, the compute nodes connected for data communications using the global combining network, the global combining network capable of performing collective operations and point to point operations, that include: receiving, by an origin system messaging module on an origin compute node from an origin application messaging module on the origin compute node, a storage identifier and an operation identifier, the storage identifier specifying application storage containing an application message for transmission to at least one target compute node, and the operation identifier specifying a message passing operation to be performed by the origin application messaging module; packetizing, by the origin system messaging module, the application message into network packets for transmission to the target compute node, each network packet specifying the operation identifier and an operation type for the message passing operation specified by the operation identifier; and transmitting, by the origin system messaging module, the network packets to the target compute node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
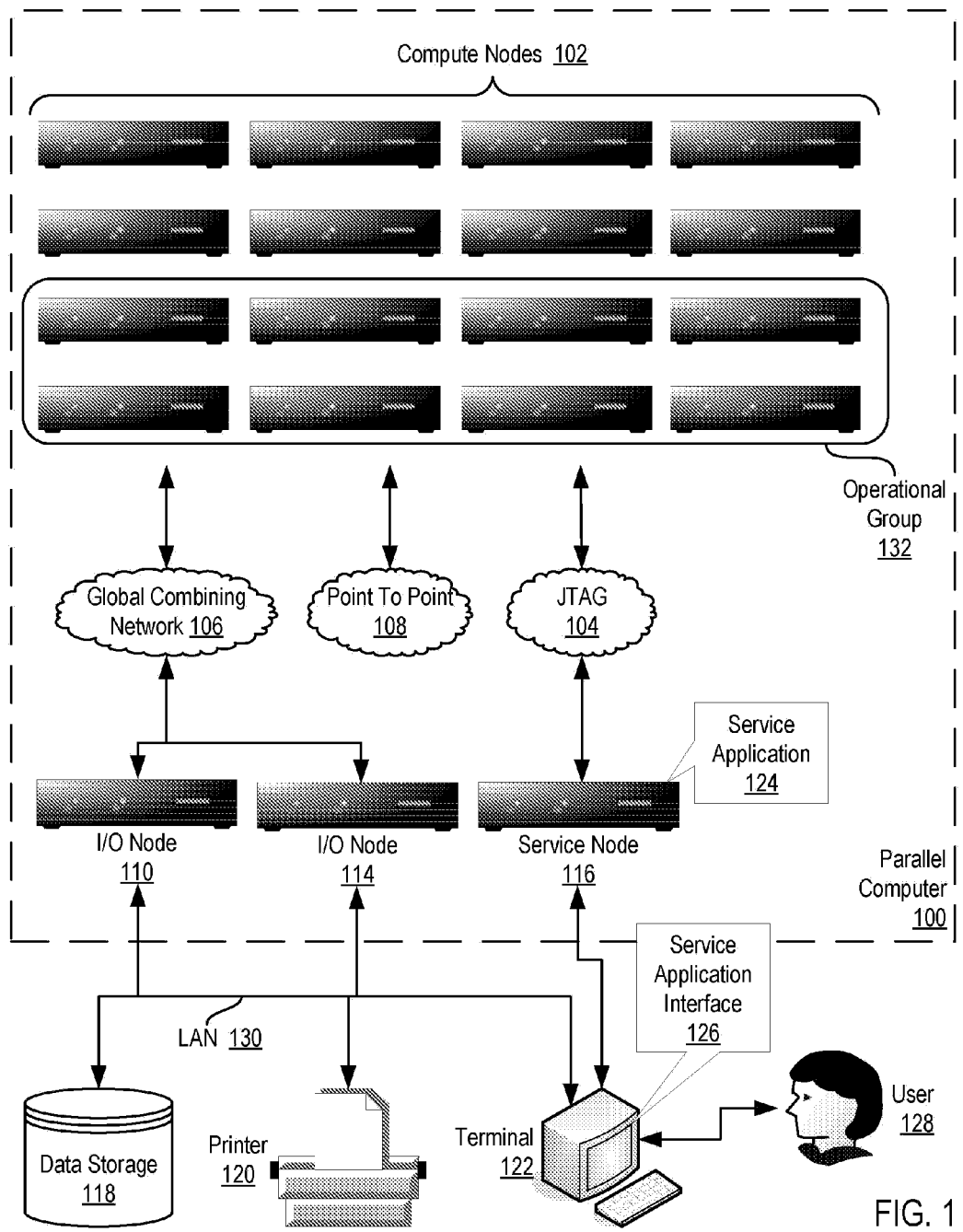
FIG. 1 illustrates an exemplary system for dispatching packets on a global combining network of a parallel computer according to embodiments of the present invention.

Exemplary methods, apparatus, and computer program products for dispatching packets on a global combining network of a parallel computer according to embodiments of the present invention are described with reference to the accompanying drawings, beginning with FIG. 1. FIG. 1 illustrates an exemplary system for dispatching packets on a global combining network of a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally to for dispatching packets on a global combining network (106) of a parallel computer (100) according to embodiments of the present invention. The parallel computer (100) includes a plurality of compute nodes (102) connected for data communications using the global combining network (106). The global combining network (106) is capable of performing collective message passing operations and point to point message passing operations. The system of FIG. 1 operates generally for dispatching packets on a global combining network of a parallel computer according to embodiments of the present invention by: receiving, by an origin system messaging module on an origin compute node from an origin application messaging module on the origin compute node, a storage identifier and an operation identifier, the storage identifier specifying application storage containing an application message for transmission to at least one target compute node, and the operation identifier specifying a message passing operation to be performed by the application messaging module; packetizing, by the origin system messaging module, the application message into network packets for transmission to the target compute node, each network packet specifying the operation identifier and an operation type for the message passing operation specified by the operation identifier; and transmitting, by the origin system messaging module, the network packets to the target compute node. Readers will note that the origin compute node is a compute node attempting to transmit a message, while the target compute node is a compute node intended as the recipient of the message.

Turning now to the perspective of the target compute node: the system of FIG. 1 also operates generally for dispatching packets on a global combining network of a parallel computer according to embodiments of the present invention by: receiving, by a target system messaging module on the target compute node, one of the network packets; identifying, by the target system messaging module, the operation type and the operation identifier for the received network packet; and executing, by the target system messaging module, a callback function in dependence upon the operation type and the operation identifier.

The arrangement of nodes, networks, and I/O devices making up the exemplary system illustrated in FIG. 1 are for explanation only, not for limitation of the present invention. Data processing systems capable of dispatching packets on a global combining network of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of dispatching packets on a global combining network of a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Dispatching packets on a global combining network of a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of dispatching packets on a global combining network of the parallel computer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates application storage for storing a message for transmission to another compute node.

Also stored RAM (156) are first and second application messaging modules (160, 607), each libraries of computer program instructions that carry out parallel communications among compute nodes, including point to point operations as well as collective operations. Application program (158) effects data communications with other applications running on other compute nodes by calling software routines in the application messaging modules (160, 607). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library, the 'Parallel Virtual Machine' ('PVM') library, and the Aggregate Remote Memory Copy Interface ('ARMCI') library.

Also stored in RAM (156) is a system messaging module (161) that implements system specific protocols for communications that support messaging for application (158) and the application messaging module (160). Such system specific protocols are typically invoked through a set of APIs that are exposed to the application messaging module (160). Such system specific protocols used for communications in the system messaging module (161) are typically isolated from the application (158) through the application messaging module (160), thus making the interface provided to the application (158) somewhat independent of system specific details implemented in the system messaging module (161). In carrying out system specific communications protocols, the system messaging module (161) typically accesses communications hardware and software useful according to the present invention such as, for example, DMA controller (195), DMA engine (197), and data communications adapters (180, 188).

Figure 2:
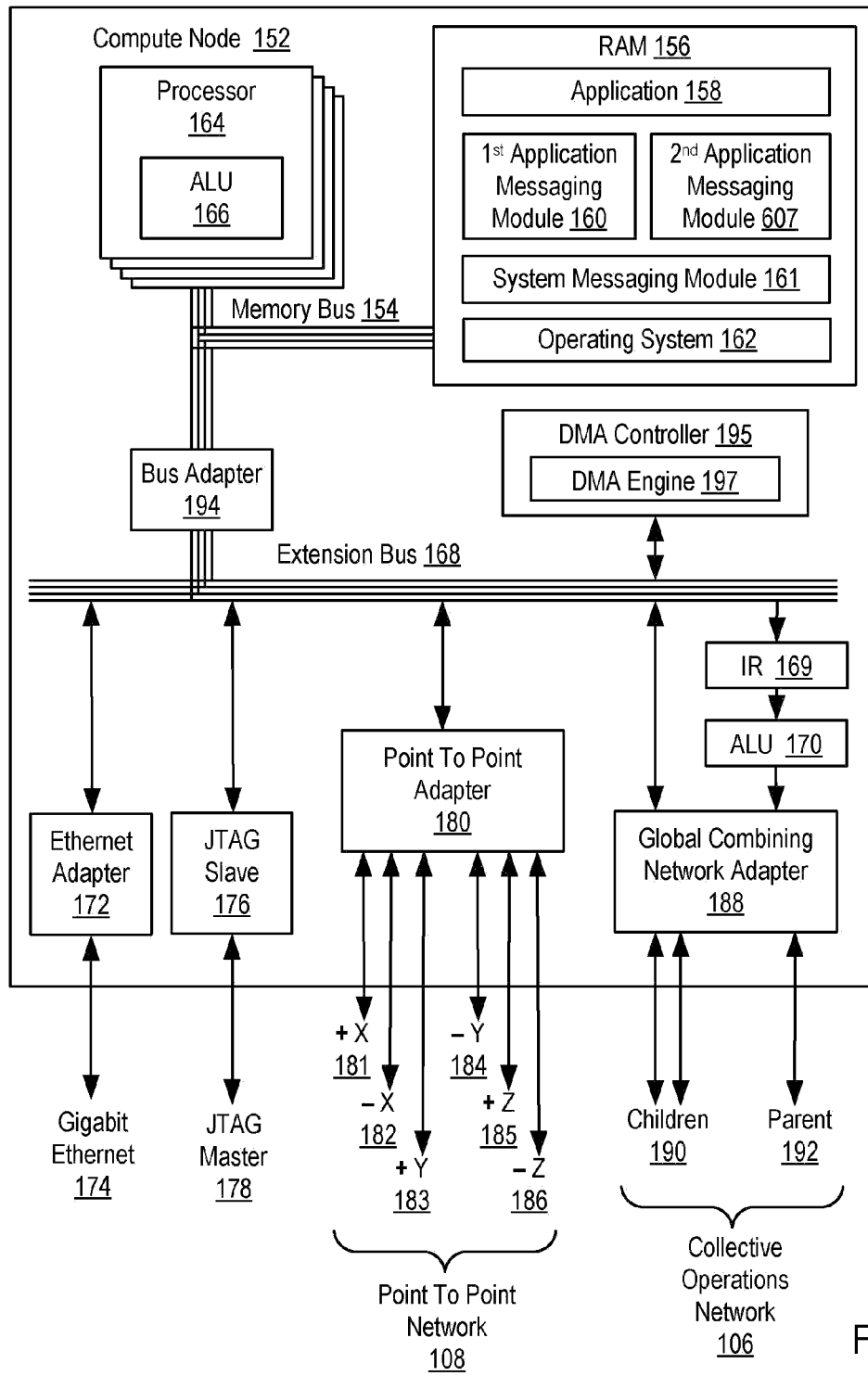
FIG. 2 sets forth a block diagram of an exemplary compute node useful in a parallel computer capable of dispatching packets on a global combining network of the parallel computer according to embodiments of the present invention.

The system messaging module (161) of FIG. 2 includes a set of computer program instructions capable of dispatching packets on a global combining network of a parallel computer according to embodiments of the present invention. The system messaging module (161) of FIG. 1 operates generally for dispatching packets on a global combining network of a parallel computer according to embodiments of the present invention by: receiving, from one of the application messaging modules (160, 607) on the origin compute node (152), a storage identifier and an operation identifier, the storage identifier specifying application storage containing an application message for transmission to at least one target compute node, and the operation identifier specifying a message passing operation to be performed by the application messaging module providing the identifiers; packetizing the application message into network packets for transmission to the target compute node, each network packet specifying the operation identifier and an operation type for the message passing operation specified by the operation identifier; and transmitting the network packets to the target compute node.

Because more than one application messaging module operates concurrently on the compute node (152), each application messaging module (160, 607) may register with the system messaging module (161). As such, the system messaging module (161) of FIG. 1 also operates generally for dispatching packets on a global combining network of a parallel computer according to embodiments of the present invention by: receiving, from each of the application messaging modules (160, 607), a registration request for each of the message passing operations to be performed by the application messaging modules (160, 607) and providing, to the application messaging modules (160, 607) in response to receiving the registration requests, operation identifiers for each of the message passing operations.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for dispatching packets on a global combining network of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in dispatching packets on a global combining network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the system messaging module (161), and thereby the application message module (160), for dispatching packets on a global combining network of a parallel computer according to embodiments of the present invention.

Figure 3A:
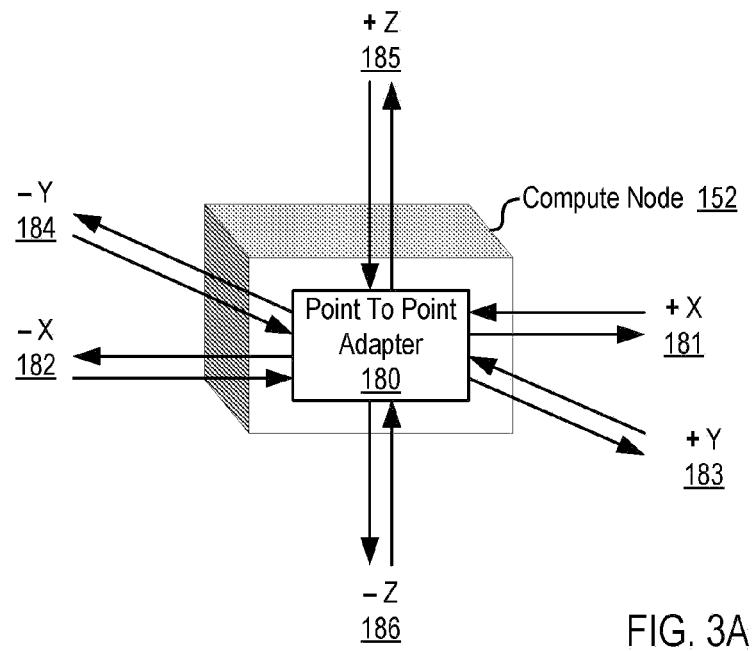
FIG. 3A illustrates an exemplary Point To Point Adapter useful in systems capable of dispatching packets on a global combining network of a parallel computer according to embodiments of the present invention.

For further explanation, FIG. 3A illustrates an exemplary Point To Point Adapter (180) useful in systems capable of dispatching packets on a global combining network of a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
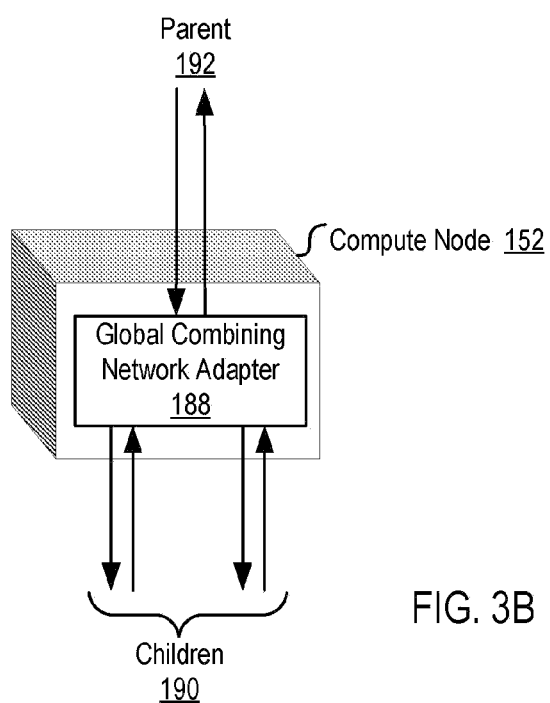
FIG. 3B illustrates an exemplary Global Combining Network Adapter useful in systems capable of dispatching packets on a global combining network of a parallel computer according to embodiments of the present invention.

For further explanation, FIG. 3B illustrates an exemplary Global Combining Network Adapter (188) useful in systems capable of dispatching packets on a global combining network of a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
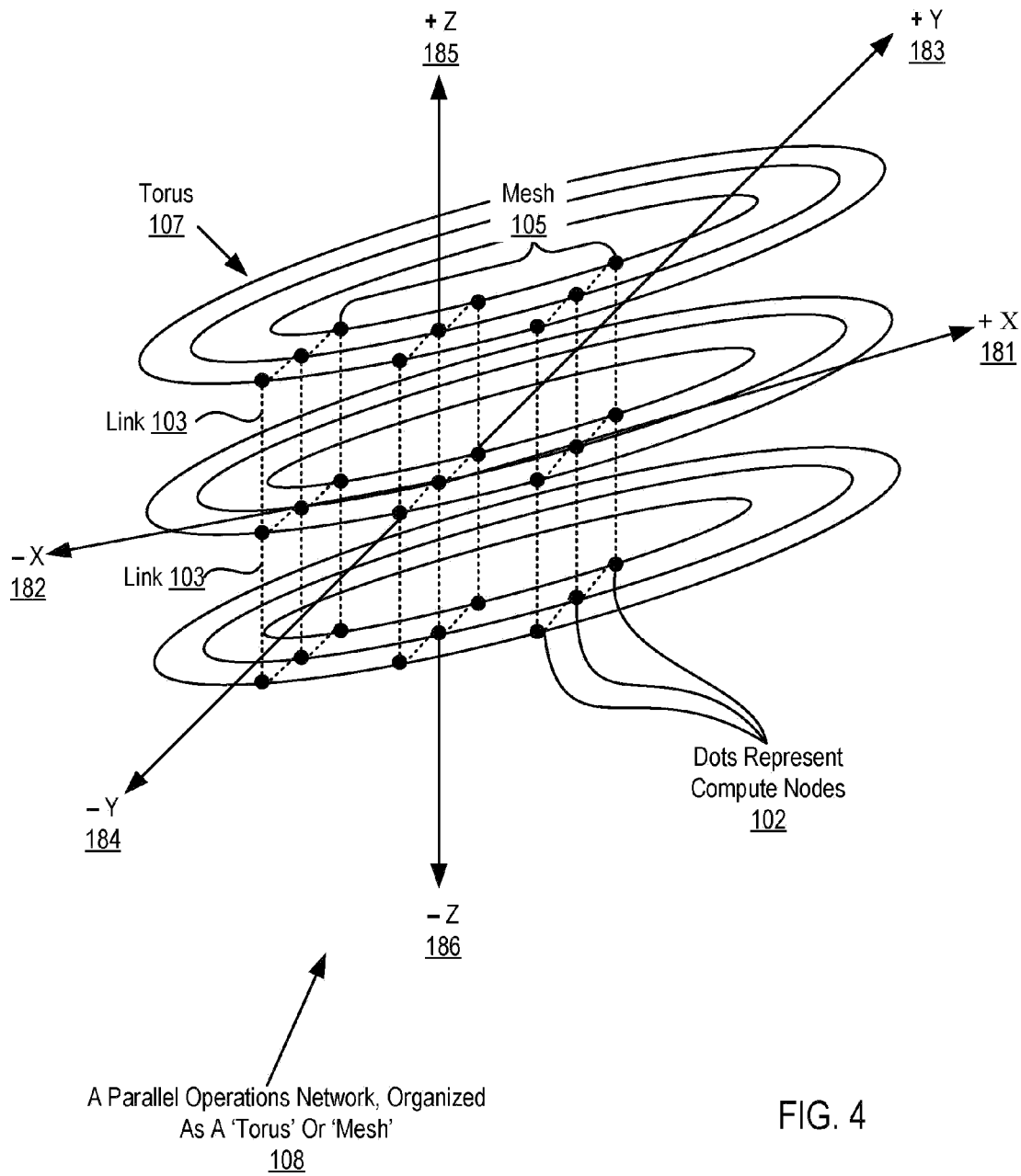
FIG. 4 sets forth a line drawing illustrating an exemplary data communications network optimized for point to point operations useful in systems capable of dispatching packets on a global combining network of a parallel computer in accordance with embodiments of the present invention.

For further explanation, FIG. 4 sets forth a line drawing illustrating an exemplary data communications network (108) optimized for point to point operations useful in systems capable of dispatching packets on a global combining network of a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in dispatching packets on a global combining network of a parallel computer in accordance with embodiments of the present invention may contain only a few compute nodes or may contain thousands of compute nodes.

Figure 5:
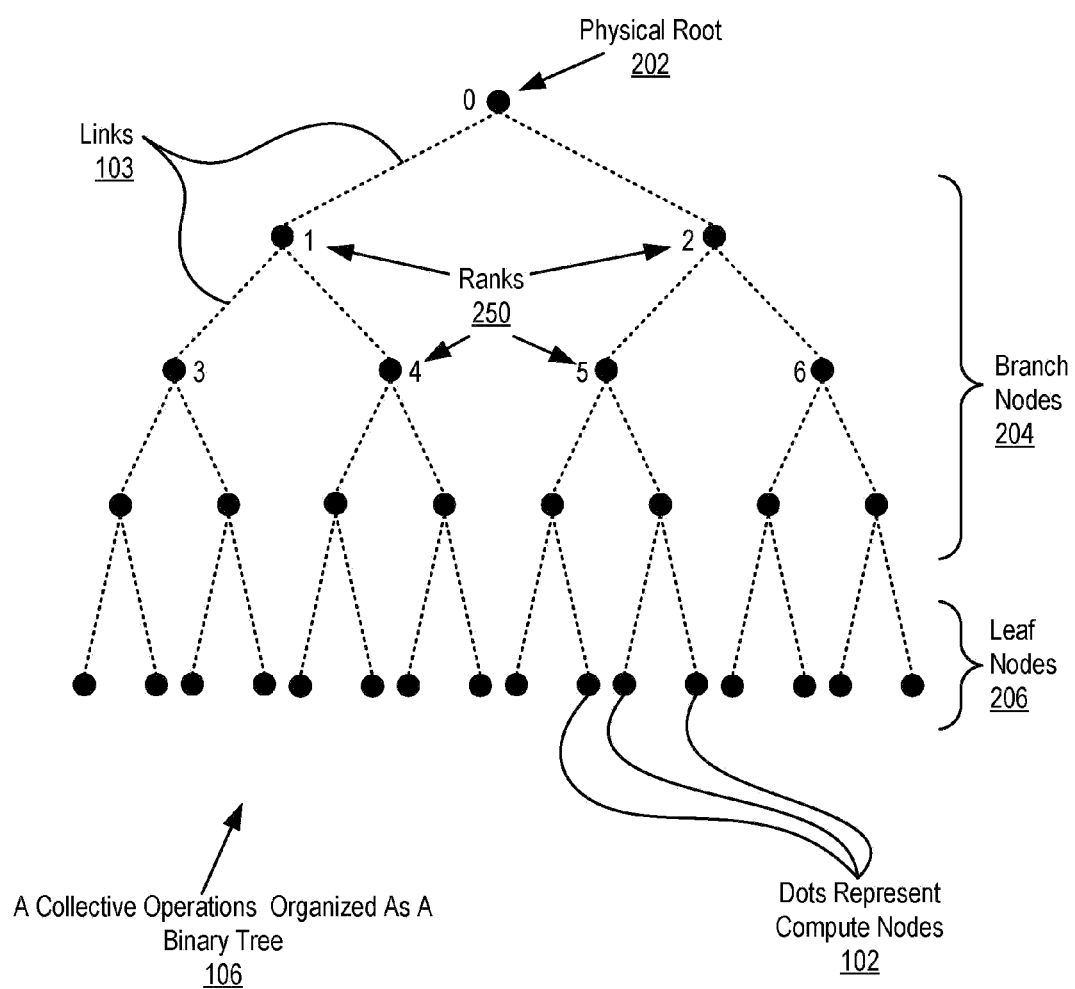
FIG. 5 sets forth a line drawing illustrating an exemplary data communications network optimized for collective operations useful in systems capable of dispatching packets on a global combining network of a parallel computer in accordance with embodiments of the present invention.

For further explanation, FIG. 5 sets forth a line drawing illustrating an exemplary data communications network (106) optimized for collective operations useful in systems capable of dispatching packets on a global combining network of a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for dispatching packets on a global combining network of a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
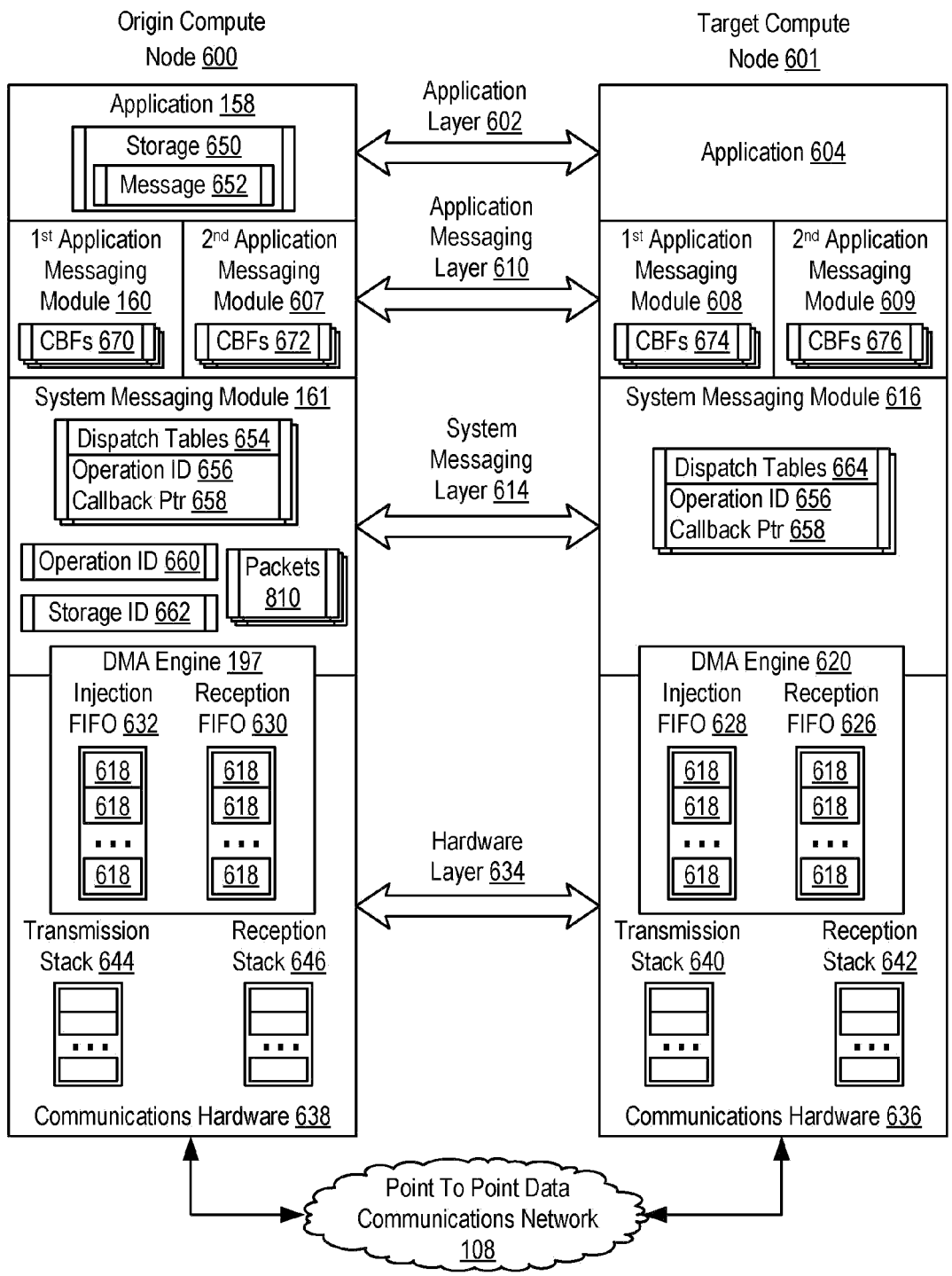
FIG. 6 sets forth a block diagram illustrating an exemplary communications architecture illustrated as a protocol stack useful in dispatching packets on a global combining network of a parallel computer according to embodiments of the present invention.

For further explanation, FIG. 6 sets forth a block diagram illustrating an exemplary communications architecture illustrated as a protocol stack useful in dispatching packets on a global combining network of a parallel computer according to embodiments of the present invention. The exemplary communications architecture of FIG. 6 sets forth two compute nodes, an origin compute node (600) and a target compute node (601). Only two compute nodes are illustrated in the example of FIG. 6 for ease of explanation and not for limitation. In fact, dispatching packets on a global combining network of a parallel computer according to embodiments of the present invention may be implemented using many compute nodes in very large scale computer systems such as parallel computers with thousands of nodes.

The exemplary communications architecture of FIG. 6 includes an application layer (602) composed of application (158) installed on the origin compute node (600) and application (604) installed on the target compute node (601). Data communications between applications (158, 604) are effected using application messaging modules (160, 607, 608, 609) installed on each of the compute nodes (600, 601). Applications (158, 604) may communicate messages by invoking functions of an application programming interfaces ('API') exposed by corresponding application messaging modules (160, 607, 608, 609). In the example of FIG. 6, the first origin application messaging module (160) corresponds to the first target application messaging module (608) because both messaging module (160, 608) expose the same APIs to the applications (158, 604). Similarly, the second origin application messaging module (607) corresponds to the second target application messaging module (609) because both messaging module (607, 609) expose the same APIs to the applications (158, 604). For the origin compute node's application (158) to transmit messages to the target compute node's application (604), the origin compute node's application (158) typically calls a 'send' messaging function exposed by one of the application messaging modules (160, 607), while the target compute node's application (158) typically calls a 'receive' messaging function exposed by the corresponding application messaging module on the target node (601). Through the APIs, each application (158, 604) also provides match data to the corresponding application messaging modules.

Match data is the data used by the application messaging layer (610) to match the 'send' function called by the origin compute node's application (604) with the 'receive' function called by the target compute node's application (158) so that the data specified in the 'send' function is stored in the location specified in the 'receive' function. Match data may be implemented, for example, as a data structure specifying the origin compute node's unique rank in the operational group, a tag number provided by the application, and a context that identifies the particular operational group of compute nodes involved in the transfer.

The exemplary communications architecture of FIG. 6 includes an application messaging layer (610) that provides a hardware-independent messaging interface that supports messaging in the application layer (602). Such a messaging interface is typically utilized by applications (158, 604) in the application layer (602) through a set of APIs exposed by application messaging modules. In the example of FIG. 6, the messaging layer (610) is composed of a first origin application messaging module (160) and a second origin application messaging module (607) installed on the origin compute node (600) and a first target application messaging module (608) and a second target application messaging module (609) installed on the target compute node (601). Each of the application messaging modules (160, 607) exposes a different message passing API to the applications (158, 604). For example, the first origin application messaging module (160) and the first target application messaging module (608) may expose an API to applications (158, 604) according to the MPI family of specifications. The second origin application messaging module (607) and the second target application messaging module (609) may expose an API to applications (158, 604) according to the PVM or ARMCI specifications.

Each of the application messaging modules (160, 607, 608, 609) includes its respective set of callback functions ('CBFs') (670, 672, 674, 676). When an application messaging module invokes an operation in the system messaging layer (614), the application messaging module provides the system messaging module with a pointer to a callback function for that particular operation. To return processing control to the application messaging module for data processing, the system messaging module calls the callback function.

The system messaging layer (614) in the exemplary communications architecture of FIG. 6 implements hardware-specific protocols for communications that support messaging in the application layer (602) and the application messaging layer (610). Such system specific protocols are typically invoked through a set of APIs that are exposed to the application messaging layer (610). Such system specific protocols used for communications in the system messaging layer (614) are typically isolated from the application layer (602) through the application messaging layer (610), thus making the interface provided to the application layer (602) somewhat independent of system-specific details implemented in the system messaging layer (614). In the example of FIG. 6, the system messaging layer (614) is composed of an origin system messaging module (161) installed on the origin compute node (600) and a target system messaging module (616) installed on the target compute node (601).

The system messaging layer (614) of FIG. 2 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging layer (614) typically accesses communications hardware and software useful according to the present invention such as, for example, DMA controllers, DMA engines, data communications hardware, and so on.

The exemplary communications architecture of FIG. 6 also includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 601) on the physical network medium. The hardware layer (634) of FIG. 6 is composed of communications hardware (638) of the origin compute node (600), communications hardware (636) of the target compute node (601), and the data communications network (108) connecting the origin compute node (600) to the target compute node (601). Such communications hardware may include, for example, point-to-point adapters and DMA controllers as described above with reference to FIGS. 2 and 3A. In the example of FIG. 6, the communications hardware (636 and 638) each include a transmission stack (640 and 644) for storing network packets for transmission to other communications hardware through the data communications network (108), and each include a reception stack (642 and 646) for storing network packets received from other communications hardware through the data communications network (108).

The exemplary communications architecture of FIG. 6 illustrates a DMA engine (197) for the origin compute node (600) and a DMA engine (620) for the target compute node (601). The DMA engines (620 and 197) in the example of FIG. 6 are illustrated in both the system messaging layer (614) and the hardware layer (634). The DMA engines (197, 620) are shown in both the system messaging layer (614) and the hardware layer (634) because a DMA engine useful in embodiments of the present invention may often provide system messaging layer interfaces and also implement communications according to some aspects of the communication hardware layer (634). The exemplary DMA engines (197, 620) of FIG. 6 each include an injection FIFO buffer (628 and 632) for storing data descriptors (618) for messages to be sent to other DMA engines on other compute nodes using a memory FIFO data transfer operation or direct put data transfer operation. The exemplary DMA engines (620 and 197) of FIG. 6 each also include a reception FIFO buffer (626 and 630) for storing data descriptors (618) for messages received from other DMA engines on other compute nodes. Although FIG. 6 only illustrates a single injection FIFO buffer and a single reception FIFO buffer, readers will note that a DMA engine may have access to any number of injection FIFO buffers and reception FIFO buffers as will occur to those of ordinary skill in the art for carrying out embodiments of the present invention.

In the example of FIG. 6, the system messaging modules (161, 616) each include a set of computer program instructions capable of dispatching packets on a global combining network of a parallel computer according to embodiments of the present invention. The origin system messaging module (161) may operate generally for dispatching packets on a global combining network of a parallel computer according to embodiments of the present invention by: receiving, from each of the application messaging modules (160, 607), a registration request for each of the message passing operation to be performed by the application messaging modules (160, 607) and providing to the application messaging modules (160, 607) in response to receiving the registration request, an operation identifier for each of the message passing operations. The target system messaging module (616) may operate generally for dispatching packets on a global combining network of a parallel computer according to embodiments of the present invention in a similar manner.

In the example of FIG. 6, both system messaging modules (161, 616) assign the same operation identifier to the same message passing operation for corresponding application messaging modules. For example, if both the first origin and target messaging modules (160, 608) are implemented according to MPI, the system messaging modules (161, 616) assign the same operation identifier to a broadcast operation, the same operation identifier to a send operation, the same operation identifier to a receive operation, the same operation identifier to a gather operation, and so on. Readers will note that in the example of FIG. 6, the message passing operations may be implemented as point to point message passing operations such as, for example, send or receive operations. The message passing operations may also be implemented as collective message passing operations such as, for example, broadcast, scatter, gather, or all-to-all operations.

The registration requests provided by the origin application messaging modules (160, 607) to the origin system messaging module (161) and the registration requests provided by the target application messaging modules (608, 609) to the target system messaging module (616) each specify a pointer (658) to a callback function of the application messaging module requesting registration. As mentioned above, the callback functions are used by the system messaging modules to return processing control to the application messaging modules. The system messaging modules (161, 616) each associates the callback pointer (658) of a callback function for a message passing operation with the operation identifier (656) for the message passing operation in one of the dispatch tables (654, 664). For example, the dispatch table (654) may associate an operation identifier for a broadcast operation of the first origin application messaging module (160) with a pointer to the first origin application messaging module's callback function for the broadcast operation. Similarly, the dispatch table (664) may associate an operation identifier for a broadcast operation of the first target application messaging module (608) with a pointer to the first target application messaging module's callback function for the broadcast operation.

Readers will note that, in the example of FIG. 6, the origin system messaging module (161) utilizes dispatch tables (654), one table for collective operations and one table for point to point operations. Similarly, the target system messaging module (616) utilizes dispatch tables (664), one table for collective operations and one table for point to point operations. Although separate tables exist for collective operations and point to point operations in the example of FIG. 6, readers will note that these two tables may be combined into a single table or split into any number of tables.

After the origin application messaging modules (160, 607) have registered with the origin system messaging module (161) and the target application messaging modules (608, 609) have registered with the target system messaging module (616), one of the origin application messaging modules (160, 607) may instruct the origin node's system messaging module (161) to dispatch packets on a global combining network to the target compute node (601). The origin system messaging module (161) operates generally for dispatching packets on a global combining network of a parallel computer according to embodiments of the present invention by: receiving, from an origin application messaging module (160), a storage identifier (662) and an operation identifier (660), the storage identifier (662) specifying application storage (650) containing an application message (652) for transmission to at least one target compute node (601), and the operation identifier (660) specifying a message passing operation to be performed by the application messaging module (160); packetizing the application message (652) into network packets (810) for transmission to the target compute node (601), each network packet (810) specifying the operation identifier and an operation type for the message passing operation specified by the operation identifier; and transmitting the network packets (810) to the target compute node (601).

In the example of FIG. 6, the operation type specified by each packet (810) indicates whether the message passing operation for which the packet (810) was generated is a collective operation or a point to point operation. Because the operation identifier in a collective operations packet (810) may be stored in a different location in the packet (810) than the operation identifier in a point to point packet (810), the target compute node (601) receiving the packets (810) may uses the operation type to retrieve the operation identifier contained in the packets (810). For packets generated for a collective operation, the operation identifier is stored in the header of the packet. For packets generated for a point to point operation, the operation identifier is stored in the first portion of the payload of the packet.

In the example of FIG. 6, the target system messaging module (616) may also operate for dispatching packets on a global combining network of a parallel computer according to embodiments of the present invention. The target system messaging module (616) may operate for dispatching packets on a global combining network of a parallel computer according to embodiments of the present invention by: receiving one of the network packets; identifying the operation type and the operation identifier for the received network packet; and executing a callback function in dependence upon the operation type and the operation identifier. As mentioned above, the target system messaging module (616) may execute a callback function in dependence upon the operation type and the operation identifier by retrieving the operation identifier from the location in the packet specified by the operation type, looking up the callback pointer (658) associated with the retrieved operation identifier in the dispatch table (664) for the operation type, and executing the callback function specified by the callback pointer (658).

As mentioned above, the system messaging modules (161, 616) on both the origin node (600) and the target node (601) in FIG. 6 use the same operation identifier when registering the same message passing operations for corresponding application messaging modules. For example, consider that the first application messaging modules (160, 608) are implemented according to the MPI specification. The same operation identifier is assigned to a broadcast operation for the first application messaging modules (160, 608). In such a manner, when the first origin application messaging module (160) utilizes the origin system messaging module (161) to perform a broadcast operation, all of the packets for that operation contain the operation identifier assigned to the broadcast operation for the MPI application messaging module. As the target system messaging module (616) receives the packets, the target system messaging module (616) can identify the operation identifier for the packet and use the dispatch tables (664) to identify the callback function for the first target application messaging module (608) used to process the packets. Because the application messaging layer (610) may be implemented according to multiple message passing specification concurrently, the system described above with reference to FIG. 6 allows the system messaging layer (614) to correctly dispatch packets to the proper application messaging module implementation in the application messaging layer (610).

Figure 7A:
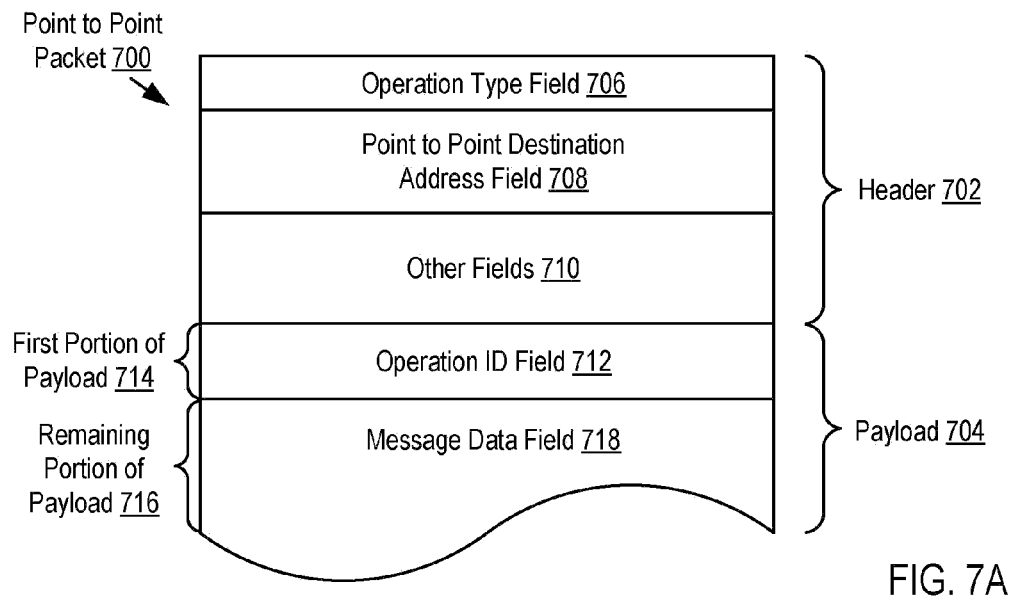
FIG. 7A sets forth a line drawing illustrating an exemplary point to point packet useful in dispatching packets on a global combining network of a parallel computer according to embodiments of the present invention.

As mentioned above, the operation type specified by a network packet described above may be used to indicate the location of the operation identifier in that network packet. For packets generated for a point to point operation, the operation identifier may be stored in the first portion of the payload of the packet. For further explanation, therefore, FIG. 7A sets forth a line drawing illustrating an exemplary point to point packet (700) useful in dispatching packets on a global combining network of a parallel computer according to embodiments of the present invention. The exemplary point to point packet (700) of FIG. 7A includes a header (702) and a payload (704). The header (702) of FIG. 7A includes an operation type field (706) for storing the operation type of the packet (700). The header (702) of FIG. 7A includes a point to point destination address field (708) for storing the network address of the target compute node to receive the packet (700). The header (702) of FIG. 7A also includes other fields (710) such as, for example, a no-op field. The payload (704) of FIG. 7A includes an operation identifier field (712) for storing the operation identifier for the packet (700). The payload (704) of FIG. 7A also includes message data field (718) for storing message data packetized into the packet (700). The operation identifier field (712) is arranged in the first portion (714) of the payload (704), while the message data field (718) is arranged in the remaining portion (716) of the payload (704).

Figure 7B:
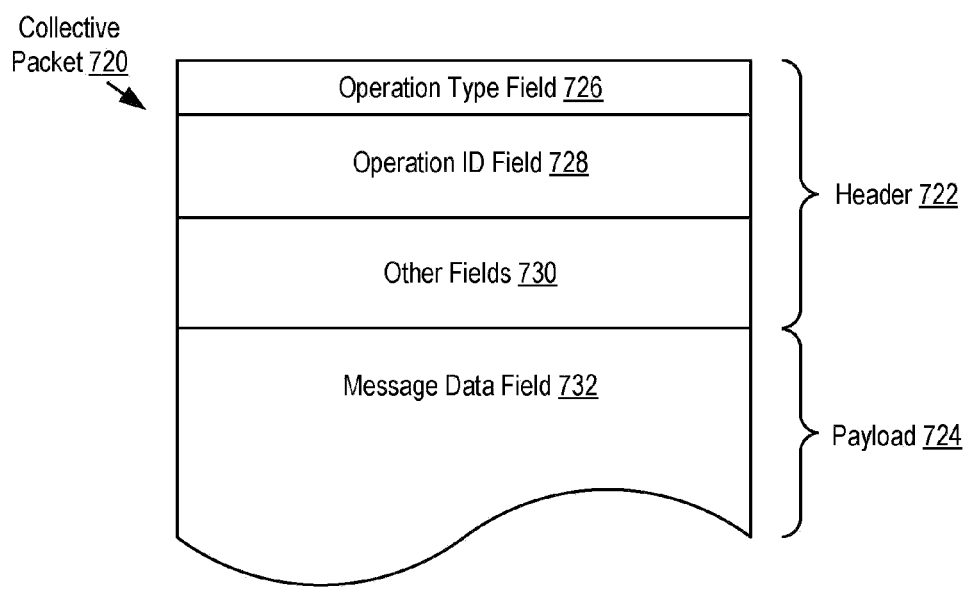
FIG. 7B sets forth a line drawing illustrating an exemplary collective packet useful in dispatching packets on a global combining network of a parallel computer according to embodiments of the present invention.

For packets generated for a collective operation, the operation identifier may be stored in the header of the packet because the point to point destination address field is not needed in a packet for a collective operation. That is, a packet for a collective operation is typically transmitted along a predefined route to all the nodes of interest in the global combining network. For further explanation, therefore, FIG. 7B sets forth a line drawing illustrating an exemplary collective packet (720) useful in dispatching packets on a global combining network of a parallel computer according to embodiments of the present invention. The exemplary collective packet (720) of FIG. 7B includes a header (722) and a payload (724). The header (722) of FIG. 7B includes an operation type field (726) for storing the operation type of the packet (720). The header (722) of FIG. 7B includes operation identifier field (728) for storing the operation identifier for the packet (720). The header (722) of FIG. 7B also includes other fields (730) such as, for example, a no-op field. The payload (724) of FIG. 7B includes message data field (732) for storing message data packetized into the packet (720).

Figure 8:
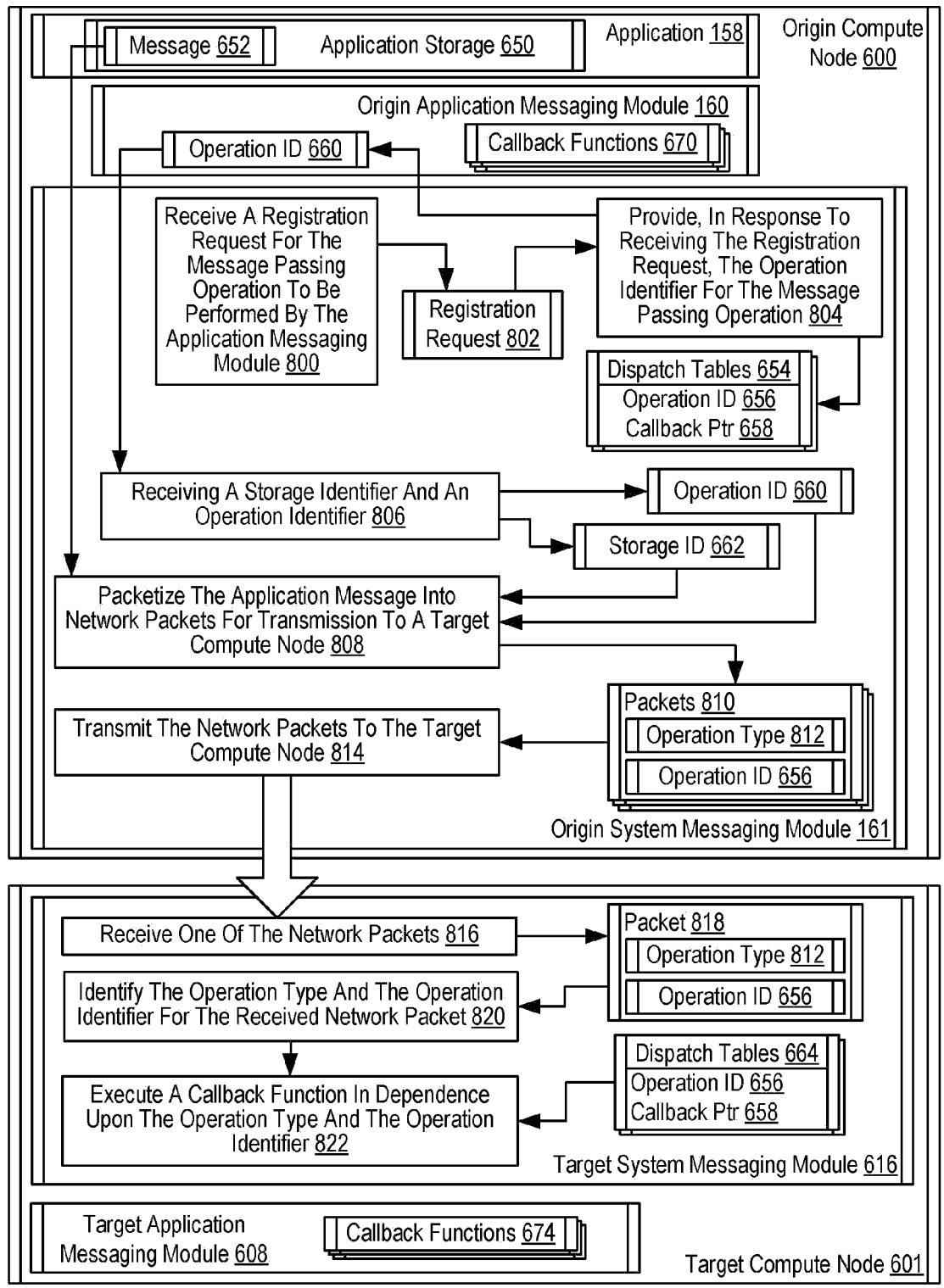
FIG. 8 sets forth a flow chart illustrating an exemplary method for dispatching packets on a global combining network of a parallel computer according to embodiments of the present invention.

For further explanation, FIG. 8 sets forth a flow chart illustrating an exemplary method for dispatching packets on a global combining network of a parallel computer according to embodiments of the present invention. The parallel computer includes a plurality of compute nodes connected for data communications using the global combining network. The global combining network is capable of performing collective operations and point to point operations.

The method of FIG. 8 includes receiving (800), by the origin system messaging module (161) from the application messaging module (160), a registration request (802) for the message passing operation to be performed by the application messaging module (160). The registration request (802) of FIG. 8 represent a request from the origin application messaging module (160) to register a particular message passing operation capable of being performed by the application messaging module (160) with the origin system messaging module (161). The registration request (802) of FIG. 8 specifies a pointer (658) to a callback function for the particular message passing operation with which the origin system messaging module (161) may return processing control to the origin application messaging module (160) for data processing. The origin system messaging module (161) may receive (800) the registration request (802) from the application messaging module (160) according to the method of FIG. 8 when the origin application message module (160) invokes a registration function of an API exposed by the origin system messaging module (161).

The method of FIG. 8 also includes providing (804), by the origin system messaging module (161) to the application messaging module (160) in response to receiving the registration request (802), an operation identifier (660) for the message passing operation. The origin system messaging module (161) may provide (804) the operation identifier (660) to the origin application messaging module (160) according to the method of FIG. 8 by associating the callback pointer (658) with the operation identifier (656) in one of the dispatch tables (654) and returning the operation identifier (660) to the origin application messaging module (160) as a return value for the registration function of the API exposed by the origin system messaging module (161) to the origin application messaging module (160). In the example of FIG. 8, the particular dispatch table (654) in which the callback pointer (658) and the operation identifier (656) are associated depends on whether the message passing operation specified by the operation identifier (656) is a collective operation or a point to point operation. Callback pointers and operation identifiers for collective operations are stored in one of the dispatch tables (654), while callback pointers and operation identifiers for point to point operations are stored in another one of the dispatch tables (654). Readers will note, however, such an implementation is for explanation only and not for limitation. Readers will also note that the target application messaging module (608) of FIG. 8 registers message passing operation with the target system messaging module (616) in a manner similar to the method described above.

The method of FIG. 8 includes receiving (806), by an origin system messaging module (161) on an origin compute node (600) from an origin application messaging module (160) on the origin compute node (600), a storage identifier (662) and an operation identifier (660). The storage identifier (662) of FIG. 8 specifies application storage (650) containing an application message (652) for transmission to at least one target compute node (601). The operation identifier (660) of FIG. 8 specifies a message passing operation to be performed by the origin application messaging module (160). The origin system messaging module (161) may receive (806) the storage identifier (662) and the operation identifier (660) from the origin application messaging module (160) according to the method of FIG. 8 as parameters to a function of an API exposed by the origin system messaging module (161) and invoked by the origin application messaging module (160).

The method of FIG. 8 also includes packetizing (808), by the origin system messaging module (161), the application message (652) into network packets (810) for transmission to the target compute node (601). Each network packet (810) of FIG. 8 specifies the operation identifier (656) and an operation type (812) for the message passing operation specified by the operation identifier (656). In the example of FIG. 8, the operation type (812) specifies whether the message passing operation is a collective operation or a point to point operation. Moreover, the operation identifier (656) is stored at a location in each network packet (810) in dependence upon the operation type (812). For example, when the operation type (812) specifies that the packet is created for a collective operation, the operation identifier (656) is stored in the first portion of the payload of the packet (810). When the operation type (812) specifies that the packet is created for a point to point operation, the operation identifier (656) is stored in header of the packet (810).

The method of FIG. 8 includes transmitting (814), by the origin system messaging module (161), the network packets (810) to the target compute node (601). The origin system messaging module (161) may transmit (814) the network packets (810) to the target compute node (601) according to the method of FIG. 8 by injecting the network packets (810) into the transmission stacks of the origin node's network adapter for transmission to the target compute node (601).

The method of FIG. 8 also includes receiving (816), by a target system messaging module (616) on the target compute node (601), one of the network packets (810). The target system messaging module (616) may receive (816) one of the network packets (810) according to the method of FIG. 8 by retrieving the packet (818) from the reception stacks in the target node's network adapter.

The method of FIG. 8 includes identifying (820), by the target system messaging module (616), the operation type (812) and the operation identifier (656) for the received network packet (818). The target system messaging module (616) may identify (820) the operation type (812) for the received network packet (818) according to the method of FIG. 8 by retrieving the operation type (812) from the first field in the header of the packet (818). As mentioned above, the location of the operation identifier in each network packet in FIG. 8 depends on the operation type. When the operation type (812) specifies that the packet (818) is for a collective operation, the target system messaging module (616) may also identify (820) the operation identifier (656) for the received network packet (818) according to the method of FIG. 8 by retrieving the operation identifier (656) from a field in the header of the packet (818). When the operation type (812) specifies that the packet (818) is for a point to point operation, the target system messaging module (616) may identify (820) the operation identifier (656) for the received network packet (818) according to the method of FIG. 8 by retrieving the operation identifier (656) from the first portion of the payload for the received network packet (818) without reading the remaining portion of the payload into computer memory. Remaining portion of the payload is not read into computer memory to avoid the overhead associated with retrieving the entire payload of the packet unnecessarily.

The method of FIG. 8 also includes executing (822), by the target system messaging module (616), a callback function (674) in dependence upon the operation type (812) and the operation identifier (656). The target system messaging module (616) may execute (822) a callback function (674) according to the method of FIG. 8 by retrieving the operation identifier (656) from the location in the packet specified by the operation type (812), looking up the callback pointer (658) associated with the retrieved operation identifier (656) in the dispatch table (664) for that particular operation type (812), and executing the callback function specified by the callback pointer (658).

Exemplary embodiments of the present invention are described largely in the context of a fully functional computer system for dispatching packets on a global combining network of a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for dispatching packets on a global combining network of a parallel computer, the parallel computer comprising a plurality of compute nodes, the compute nodes connected for data communications using the global combining network, the global combining network capable of performing collective operations and point to point operations, the method further comprising:

receiving, by an origin system messaging module on an origin compute node from an origin application messaging module on the origin compute node, a storage identifier and an operation identifier, the storage identifier specifying application storage containing an application message for transmission to at least one target compute node, and the operation identifier specifying a message passing operation to be performed by the origin application messaging module;

packetizing, by the origin system messaging module, the application message into network packets for transmission to the target compute node, each network packet specifying the operation identifier and an operation type for the message passing operation specified by the operation identifier; and transmitting, by the origin system messaging module, the network packets to the target compute node.

2. The method of claim 1 further comprising:

receiving, by a target system messaging module on the target compute node, one of the network packets;

identifying, by the target system messaging module, the operation type and the operation identifier for the received network packet; and executing, by the target system messaging module, a callback function in dependence upon the operation type and the operation identifier.

3. The method of claim 2 wherein:

the operation identifier is stored in a first portion of a payload for the received network packet; and identifying, by the target system messaging module, the operation type and the operation identifier for the received network packet further comprises retrieving the operation identifier from the first portion of the payload for the received network packet without reading the remaining portion of the payload into computer memory.

4. The method of claim 1 further comprising:

receiving, by the origin system messaging module from the origin application messaging module, a registration request for the message passing operation to be performed by the origin application messaging module; and providing, by the origin system messaging module to the origin application messaging module in response to receiving the registration request, the operation identifier for the message passing operation.

5. The method of claim 1 wherein the operation identifier is stored at a location in each network packet in dependence upon the operation type.

6. The method of claim 1 wherein the operation type specifies whether the message passing operation is a collective operation or a point to point operation.

7. A parallel computer capable of dispatching packets on a global combining network of a parallel computer, the parallel computer comprising an origin compute node and at least one target compute node, the compute nodes connected for data communications using the global combining network, the global combining network capable of performing collective operations and point to point operations, the origin compute node comprising a origin computer processor and origin computer memory operatively coupled to the origin computer processor, the origin computer memory having disposed within it computer program instructions capable of:

receiving, by an origin system messaging module on the origin compute node from an origin application messaging module on the origin compute node, a storage identifier and an operation identifier, the storage identifier specifying application storage containing an application message for transmission to at least one target compute node, and the operation identifier specifying a message passing operation to be performed by the origin application messaging module;

packetizing, by the origin system messaging module, the application message into network packets for transmission to the target compute node, each network packet specifying the operation identifier and an operation type for the message passing operation specified by the operation identifier; and transmitting, by the origin system messaging module, the network packets to the target compute node.

8. The parallel computer of claim 7 wherein the target compute node comprises a target computer processor and target computer memory operatively coupled to the target computer processor, the target computer memory having disposed within it computer program instructions capable of:

receiving, by a target system messaging module on the target compute node, one of the network packets;

identifying, by the target system messaging module, the operation type and the operation identifier for the received network packet; and executing, by the target system messaging module, a callback function in dependence upon the operation type and the operation identifier.

9. The parallel computer of claim 8 wherein the operation identifier is stored in a first portion of a payload for the received network packet; and identifying, by the target system messaging module, the operation type and the operation identifier for the received network packet further comprises retrieving the operation identifier from the first portion of the payload for the received network packet without reading the remaining portion of the payload into computer memory.

10. The parallel computer of claim 7 wherein the origin computer memory has disposed within it computer program instructions capable of:

receiving, by the origin system messaging module from the origin application messaging module, a registration request for the message passing operation to be performed by the origin application messaging module; and providing, by the origin system messaging module to the origin application messaging module in response to receiving the registration request, the operation identifier for the message passing operation.

11. The parallel computer of claim 7 wherein the operation identifier is stored at a location in each network packet in dependence upon the operation type.

12. The parallel computer of claim 7 wherein the operation type specifies whether the message passing operation is a collective operation or a point to point operation.

13. A computer program product for dispatching packets on a global combining network of a parallel computer, the parallel computer comprising a plurality of compute nodes, the compute nodes connected for data communications using the global combining network, the global combining network capable of performing collective operations and point to point operations, the computer program product disposed upon a recordable computer readable medium, the computer program product comprising computer program instructions capable of:

receiving, by an origin system messaging module on an origin compute node from an origin application messaging module on the origin compute node, a storage identifier and an operation identifier, the storage identifier specifying application storage containing an application message for transmission to at least one target compute node, and the operation identifier specifying a message passing operation to be performed by the origin application messaging module;

packetizing, by the origin system messaging module, the application message into network packets for transmission to the target compute node, each network packet specifying the operation identifier and an operation type for the message passing operation specified by the operation identifier; and transmitting, by the origin system messaging module, the network packets to the target compute node.

14. The computer program product of claim 13 further comprising computer program instructions capable of:
- receiving, by a target system messaging module on the target compute node, one of the network packets;
- identifying, by the target system messaging module, the operation type and the operation identifier for the received network packet; and
- executing, by the target system messaging module, a callback function in dependence upon the operation type and the operation identifier.

15. The computer program product of claim 14 wherein
the operation identifier is stored in a first portion of a payload for the received network packet; and
identifying, by the target system messaging module, the operation type and the operation identifier for the received network packet further comprises retrieving the operation identifier from the first portion of the payload for the received network packet without reading the remaining portion of the payload into computer memory.

16. The computer program product of claim 13 further comprising computer program instructions capable of:
- receiving, by the origin system messaging module from the origin application messaging module, a registration request for the message passing operation to be performed by the origin application messaging module; and
- providing, by the origin system messaging module to the origin application messaging module in response to receiving the registration request, the operation identifier for the message passing operation.

17. The computer program product of claim 13 wherein the operation identifier is stored at a location in each network packet in dependence upon the operation type.

18. The computer program product of claim 13 wherein the operation type specifies whether the message passing operation is a collective operation or a point to point operation.

* * * * *